US012743979B2

(12) United States Patent
Oh

(10) Patent No.: US 12,743,979 B2
(45) Date of Patent: Sep. 22, 2026

(54) DATA DRIVER WITH DYNAMIC POWER CONTROL AND DISPLAY DEVICE INCLUDING THE SAME

(71) Applicant: LG Display Co., Ltd., Seoul (KR)

(72) Inventor: Zonggun Oh, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/928,833

(22) Filed: Oct. 28, 2024

(65) Prior Publication Data

US 2025/0209950 A1 Jun. 26, 2025

(30) Foreign Application Priority Data

Dec. 26, 2023 (KR) ........................ 10-2023-0191409

(51) Int. Cl.
*G09G 3/3275* (2016.01)
*G09G 3/20* (2006.01)

(52) U.S. Cl.
CPC ....... *G09G 3/20* (2013.01); *G09G 2310/0275* (2013.01); *G09G 2310/0291* (2013.01); *G09G 2310/0297* (2013.01); *G09G 2330/021* (2013.01)

(58) Field of Classification Search
None
See application file for complete search history.

(56) References Cited

U.S. PATENT DOCUMENTS

2015/0255042 A1* 9/2015 Oh ........................... G09G 5/18 345/212
2018/0151137 A1* 5/2018 Lee ...................... G09G 3/3677
2018/0261150 A1* 9/2018 Tamura ................ G09G 3/2074
2024/0321169 A1* 9/2024 Tsuchi ................. G09G 3/2092

FOREIGN PATENT DOCUMENTS

KR 10-2016-0040010 A 4/2016
KR 20220096085 A * 7/2022 ............. G09G 5/001

OTHER PUBLICATIONS

Espacenet translation of KR20220096085A (Year: 2022).*

* cited by examiner

*Primary Examiner* — Donna V Bocar
(74) *Attorney, Agent, or Firm* — Birch, Stewart, Kolasch & Birch, LLP

(57) ABSTRACT

A display device can include a display panel including a plurality of subpixels, a data driver configured to supply a data voltage to the plurality of subpixels through a plurality of data lines, and a multiplexer connected between the data driver and the plurality of data lines, the multiplexer including a plurality of switching elements controlled by a plurality of mux control signals. Also, a power consumption mode of the data driver is configured to change based on whether turn-on periods of the plurality of mux control signals overlap with each other.

19 Claims, 11 Drawing Sheets

DATA DRIVER WITH DYNAMIC POWER CONTROL AND DISPLAY DEVICE INCLUDING THE SAME

CROSS REFERENCE TO RELATED APPLICATION

The present application claims priority to Korea Patent Application No. 10-2023-0191409, filed, in the Republic of Korea, on Dec. 26, 2023, the entirety of which is incorporated herein by reference into the present application.

BACKGROUND

Field

The present disclosure relates to a data driver and a display device including the same.

Discussion of the Related Art

As information society has developed, various types of display devices have been developed. Recently, various display devices such as a liquid crystal display (LCD), a plasma display panel (PDP), and an organic light emitting display (OLED) have been utilized.

Among them, the organic light emitting display device (OLED) displays an image using organic light emitting diodes. The organic light emitting diode (hereinafter, a light emitting diode) constituting the organic light emitting display device is a self-emission type, and does not require a separate light source (e.g., no backlight unit), so that the thickness and weight of the display device can be reduced. In addition, the organic light emitting diode display exhibits high quality characteristics such as low power consumption, high luminance, and high reaction speed.

The display device is turned on continuously when providing information to a user, and thus, consumes a large amount of power. Therefore, research and development on reduction of power consumption of the display device has been continuously conducted. However, when the power consumption of the display device is reduced, various operations of the display device may become impaired in certain situations, and various circuit elements may become less responsive (e.g., an impaired slew rate). Thus, a need exists for a display device having a configuration that can reduce power consumption while also providing an enhanced slew rate or that can prevent impairment of the slew rate.

SUMMARY OF THE DISCLOSURE

The embodiments of the present disclosure provide a data driver configured to variably control the power consumption according to a turn-on state of the switching elements provided in a multiplexer, and a display device including the same.

The embodiments of the present disclosure provide a data driver configured to temporarily adjust the power consumption up when two or more switching elements of the multiplexer are turned on, and the display device including the same.

One embodiment of the present disclosure is a display panel on which a plurality of subpixels are disposed, a data driver configured to provide a data voltage to the plurality of subpixels through a plurality of data lines, and a multiplexer connected between the data driver and the plurality of data lines and comprised of a plurality of switching elements controlled by a plurality of mux control signals.

A power consumption mode of the data driver can be configured to change according to overlap or non-overlap of turn-on periods of the plurality of mux control signals.

The data driver can be configured to temporarily adjust power consumption up when the turn-on periods of the plurality of mux control signals overlap with each other.

The data driver can include a calculator configured to output logic signals at different levels according to the overlap or non-overlap of the turn-on periods of the plurality of mux control signals, a power management circuit configured to output a bias current in response to a power control signal directing the power consumption mode and a combination signal of the logic signal, and an output buffer configured to amplify the data voltage based on the bias current and output the amplified data voltage.

The calculator can be configured to output a logic signal at a first level when at least two mux control signals among the plurality of mux control signals are at a turn-on level, and the calculator can be configured to output a logic signal at a second level which is different from the first level when only one mux control signal among the plurality of mux control signals is at a turn-on level.

The calculator can include a first logic gate group configured to compare the plurality of mux control signals sequentially, and output a logic high signal when all the compared mux control signals are at a high level, and a second logic gate group configured to output the logic signal at the first level when at least one logic signal among the logic signals output from the first logic gate group is the logic high signal.

The first logic gate group can include an AND gate configured to receive two mux control signals among the plurality of mux control signals and output the logic high signal when both the two received mux control signals are at the high level.

The second logic gate group can include an XOR gate configured to receive two logic signals among the logic signals output from the first logic gate group and output the logic high signal when the two received logic signals have different logic levels from each other.

The first logic gate group can further include a NOT gate configured to invert a logic level of the plurality of mux control signals and output the inverted signals.

The power control signal can be logically summed with the logic signal and be provided to the power management circuit.

The power consumption mode directed by the power control signal can be changed over to the power consumption mode consuming more power by the logical sum of the power control signal and the logic signal at the first level.

The power consumption circuit can be configured to change a magnitude of the bias current according to the changed power consumption mode.

Another embodiment of the present disclosure is to provide a data driver, including a register configured to generate a sampling signal using a data driving control signal applied from an outside, a latch configured to latch an image data received from an outside and output the image data in response to the sampling signal, a digital to analog converting part configured to convert the image data output from the latch into a gamma compensation voltage and generate a data voltage, a calculator configured to output a logic signal at a different level according to overlap or non-overlap of turn-on periods of a plurality of mux control signals applied from an outside, a power management circuit configured to output a bias current in response to a power control signal directing a power consumption mode and a combination signal of the logic signal, and an output buffer configured to amplify the data voltage based on the bias current and output the amplified data voltage.

The calculator can be configured to output a logic signal at a first level when at least two mux control signals among the plurality of mux control signals are at a turn-on level, and the calculator can be configured to output a logic signal at a second level which is different from the first level when only one mux control signal among the plurality of mux control signals is at a turn-on level.

The calculator can include a first logic gate group configured to compare the plurality of mux control signals sequentially, and output a logic high signal when all the compared mux control signals are at a high level, and a second logic gate group configured to output the logic signal at the first level when at least one logic signal among the logic signals output from the first logic gate group is the logic high signal.

The first logic gate group can include an AND gate configured to receive two mux control signals among the plurality of mux control signals and output the logic high signal when both the two received mux control signals are at the high level.

The second logic gate group can include an XOR gate configured to receive two logic signals among the logic signals output from the first logic gate group and output the logic high signal when the two received logic signals have different logic levels from each other.

The first logic gate group can further include a NOT gate configured to invert a logic level of the plurality of mux control signals and output the inverted signals.

The power control signal can be logically summed with the logic signal and is provided to the power management circuit.

The power consumption mode directed by the power control signal can be changed over to the power consumption mode consuming more power by the logical sum of the power control signal and the logic signal at the first level.

The power management circuit can be configured to change a magnitude of the bias current according to the changed power consumption mode.

The data driver according to the embodiments and the display device including the same variably controls power consumption of the data driver according to a driving state of the switching elements provided in the multiplexer, and can improve a slew rate of a signal output from the data driver.

In addition, the data driver according to the embodiments and the display device including the same can change the power consumption of the data driver, and therefore, can reduce the power consumption of the display device.

BRIEF DESCRIPTION OF THE DRAWINGS

The above and other objects, features, and advantages of the present disclosure will become more apparent to those of ordinary skill in the art by describing example embodiments thereof in detail with reference to the attached drawings, which are briefly described below.

DETAILED DESCRIPTION OF THE EMBODIMENTS

Figure 1:
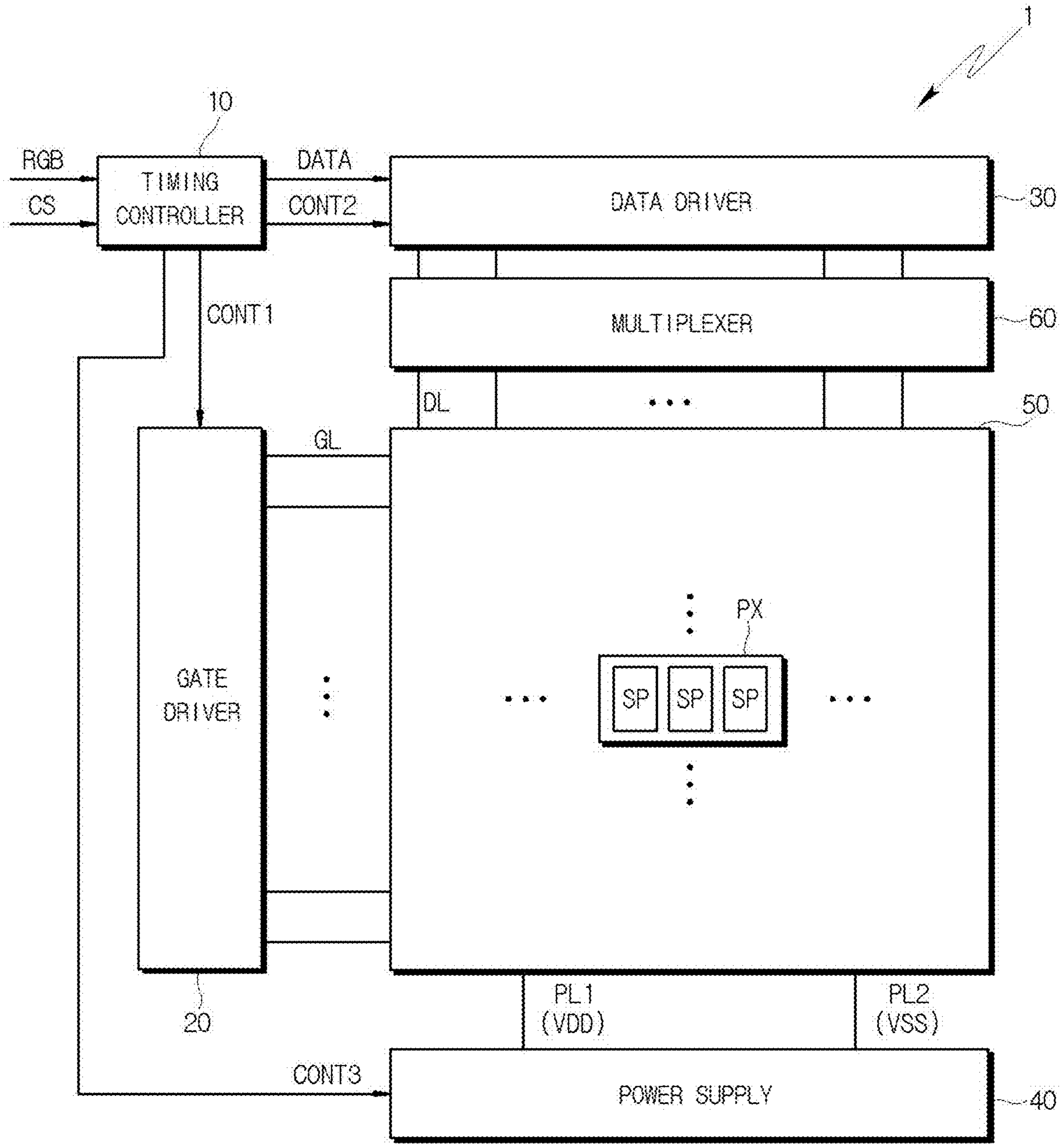
FIG. 1 is a block diagram illustrating a configuration of a display device according to an embodiment of the present disclosure.

Hereinafter, embodiments will be described in greater detail with reference to the accompanying drawings.

Advantages and characteristics of the present disclosure and a method of achieving the advantages and characteristics will be clear by referring to example embodiments described below in detail together with the accompanying drawings. However, the present disclosure is not limited to example embodiment disclosed herein but will be implemented in various forms. Throughout the specification, when an element is referred to as being “connected” to another element, the element can be “directly connected” to the other element, or “electrically connected” to the other element with one or more intervening elements interposed therebetween. Some of the parts which are not associated with the description may not be described in describing embodiments of the present invention, and like reference numerals refer to like elements throughout the specification.

The features of various embodiments of the present disclosure can be partially or entirely coupled to or combined with each other and can be interlocked and operated in technically various ways, and the embodiments can be carried out independently of or in association with each other.

FIG. 1 is a block diagram illustrating a configuration of a display device according to an embodiment of the present disclosure.

Referring to FIG. 1, the display device 1 includes a timing controller 10, a gate driver 20, a data driver 30, a power supply 40, and a display panel 50.

The timing controller 10 can receive an image signal RGB and a control signal CS from an external device. The image signal RGB can include multiple grayscale data. The control signal CS can include, e.g., a horizontal synchronization signal, a vertical synchronization signal, and a main clock signal.

The timing controller 10 processes the image signal RGB and the control signal CS to be suitable for the operating conditions of the display panel 50, thereby generating and outputting image data DATA, a gate driving control signal CONT1, and a data driving control signal CONT2, and a power supply control signal CONT3. The data driving control signal CONT2 can include, e.g., a source output enable (SOE) signal, and a power control signal etc.

The gate driver 20 can be connected to the pixels PX of the display panel 50 through a plurality of gate lines GL. The gate driver 20 can generate gate signals based on the gate driving control signal CONT1 output from the timing controller 10. The gate driver 20 can provide the generated gate signals to the pixels PX through a plurality of gate lines GL.

The data driver 30 can be connected to the pixels PX of the display panel 50 through a plurality of gate lines GL. The data driver 30 can generate data voltages based on the image data DATA and the data driving control signal CONT2 output from the timing controller 10. The data driver 30 can provide the generated data voltages to the pixels PX through the plurality of gate lines GL. The data voltages can be applied to the pixels PX of a pixel row selected by the gate signal. To this end, the data driver 30 can supply the data voltages to the plurality of data lines DL such that the data voltages are synchronized with the gate signals.

The data driver 30 can be comprised of a plurality of data driving integrated circuits (hereinafter, "DIC"). Each of the DICs can be mounted on a flexible film in a chip on film (COF) or chip on plastic (COP) method, and can be connected to one side of the display panel 50.

The power supply 40 can be connected to pixels PX of the display panel 50 through a plurality of power supply lines PL1 and PL2. The power supply 40 can generate a driving voltage to be provided to the display panel 50 based on the power supply control signal CONT3. The driving voltage can include, e.g., a high potential driving voltage VDD and a low potential driving voltage VSS. The power supply 40 can provide the driving voltages VDD and VSS to the pixels PX through the corresponding power supply lines PL1 and PL2.

Pixels PX are disposed in the display panel 50. Each of the pixels PX can include one or more subpixels SP. For example, as illustrated, the pixel PX can include a plurality of subpixels SP. The subpixels SP can be disposed in a matrix form in the display panel 50.

Each of the subpixels SP can be electrically connected to the corresponding gate line and data line. The subpixels SP can emit light at a brightness corresponding to the data voltage and the gate signal provided through the gate lines and data lines DL.

Each of the subpixels SP can display any one color among first to third colors. In one embodiment, each of the subpixels SP can display any one color among red, green and blue. In another embodiment, each of the subpixels SP can display any one color among cyan, magenta, and yellow. In various embodiments, the subpixels SP can be configured to display any one among four or more colors. For example, each of the subpixels SP can display any one among red, green, blue, and white.

In the one embodiment, the display device 1 can include a multiplexer 60 connected between the data driver 30 and the subpixels, and configured to perform time division driving of the data lines DL. The multiplexer 60 can connect each output channel of the data driver 30 to two or more data lines DL. In addition, the multiplexer 60 can reduce the number of channels of the data driver 30 by distributing a data voltage output from the channels to the data lines DL in a time division manner.

In the one embodiment, the multiplexer 60 can include a plurality of switching elements connected between the output channel of the data driver 30 and the data lines DL. For example, the multiplexer 60 can be a 1: n multiplexer of which one output channel is connected to i data lines DL1 to DLm through one switching element (e.g., i being any integer greater than 1 and less than m).

In FIG. 1, the gate driver 20, the data driver 30 and the multiplexer 60 are shown as separate components from the display panel 50, but at least one of the gate driver 20, the data driver 30 and the multiplexer 60 can be integrally formed with the display panel 50 by an in-panel method. For example, the gate driver 20 can be integrally formed with the display panel 50 according to a Gate in Panel (GIP) method.

Each of the timing controller 10, the gate driver 20, the data driver 30, and the power supply 40 can be separately configured as an integrated circuit (IC), or as an integrated circuit in which at least some among them are integrated. For example, the timing controller 10, the data driver 30, and the power supply 40 can be configured as a driving chip in a form of an integrated circuit (IC). Such a driving chip can be implemented in a form of, e.g., a flexible printed circuit board (FPCB).

Figure 2:
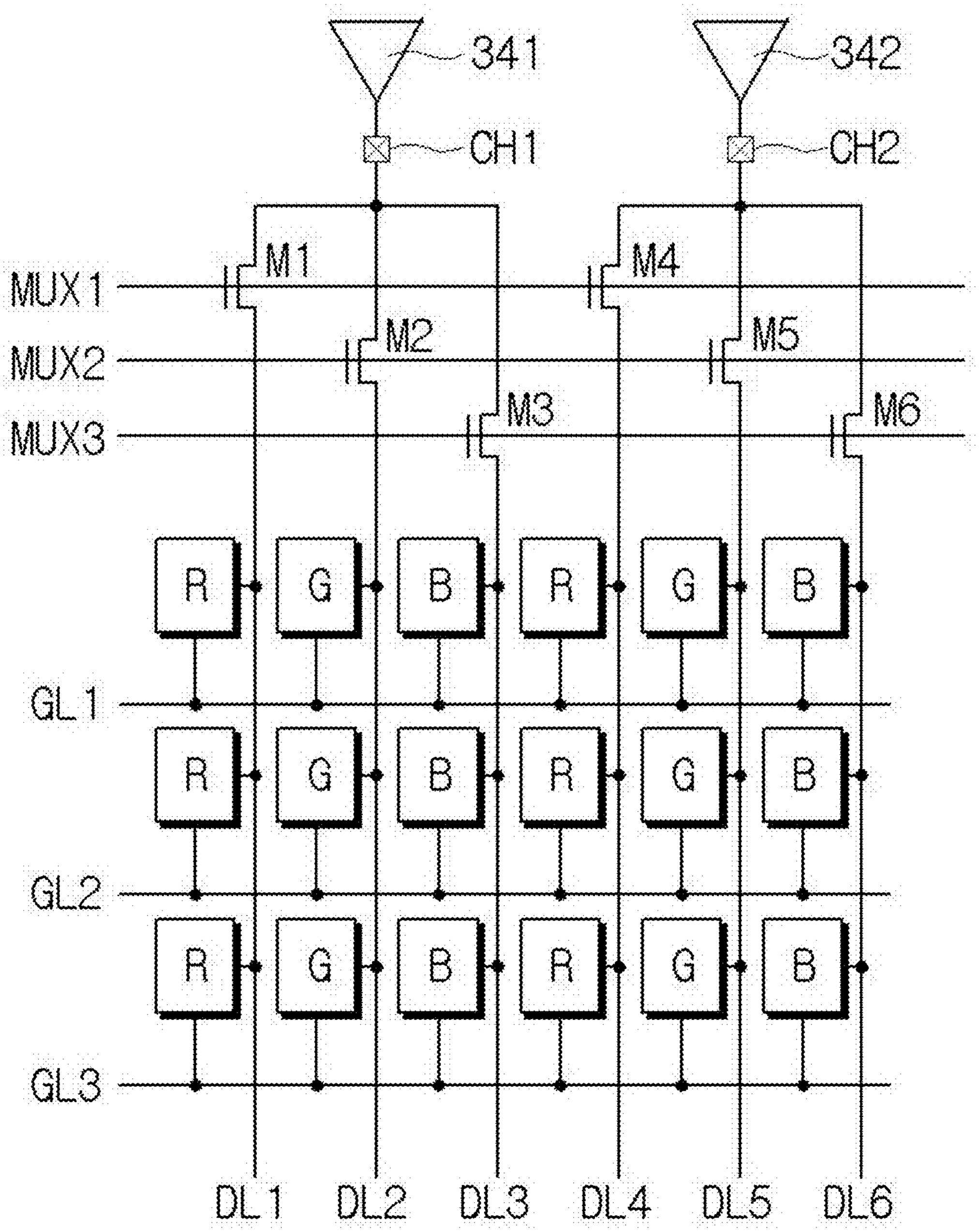
FIG. 2 is a block diagram illustrating a connection relation between a data driver, a multiplexer, and a display panel according to an embodiment of the present disclosure.

FIG. 2 is a block diagram illustrating a connection relation between the data driver, the multiplexer, and the display panel according to the one embodiment.

Referring to FIG. 2, the data driver 30 (FIG. 1) can include a plurality of output buffers 341 and 342. Each of the output buffers 341 and 342 can output a data voltage through corresponding channels CH1 and CH2. In FIG. 2, only two output buffers 341 and 342 are illustrated as an example for simplicity of explanation, however, a greater number of output buffers can be disposed on the right side.

The multiplexer 60 (FIG. 1) can include a plurality of switching elements M1 to M6. In FIG. 2, only six switching elements M1 to M6 are illustrated as an example, however, a greater number of switching elements can be disposed on the right side.

Each of the switching elements M1 to M6 can be connected to any one of the output buffers 341 and 342 of the data driver 30. At this time, two or more switching elements M1 to M6 can be connected to one output buffer 341 or 342. For example, the first, second and third switching elements M1, M2 and M3 can be connected to the first output buffer 341, and the fourth, fifth and sixth switching elements M4, M5 and M6 can be connected to the second output buffer 342.

Turning on or off of the switching elements M1 to M6 can be controlled through mux control signals MUX1, MUX2 and MUX 3 provided from the timing controller 10 (FIG. 1) and the like. In more detail, the first and the fourth switching elements M1 and M4 can be controlled according to the first mux control signal MUX1, the second and the fifth switching elements M2 and M5 can be controlled according to the second mux control signal MUX2, and the third and the sixth switching elements M3 and M6 can be controlled according to the third mux control signal MUX3. Here, the multiplexer 60 can be referred to as a 3MUX structure because switching elements M1 to M6 are controlled by three mux control signals MUI to MUX3.

The display panel 50 (FIG. 1) can include a plurality of pixels PX disposed in a matrix form. In FIG. 2, one pixel PX is configured with three subpixels R, G and B. For example, the subpixels R, G and B can include a red subpixel R, a green subpixel G, and a blue subpixel B, but embodiments are not limited thereto.

Each of the subpixels R, G and B is connected to the corresponding data lines DL1 to DL6 and gate lines GL1 to GL3. In FIG. 2, six data lines DL1 to DL6 are illustrated as an example, however, a greater number of data lines can be disposed on the right side. In addition, in FIG. 2, three gate lines GL1 to GL3 are illustrated as an example, however, a greater number of gate lines can be disposed on a lower side.

In one row of the subpixels, the red subpixel R, the green subpixel G, and the blue subpixel B can be sequentially and repeatedly disposed. One red subpixel R, one green subpixel G, and one blue subpixel B adjacently disposed to each other can form one pixel PX (e.g., three subpixels within one pixel unit).

In the one embodiment, subpixels R, G and B having the same color can be disposed in the same row or in the same column of subpixels. For example, red subpixels R can be disposed in the first and the fourth rows of the subpixels, the green subpixels G can be disposed in the second and fifth rows of the subpixels, and the blue subpixels B can be disposed in the third and the sixth rows of the subpixels. However, the present embodiment is not limited thereto. That is, the subpixels R, G and B having different colors can be disposed in one row of the subpixels or one column of subpixels according to a certain pattern, in another various embodiments.

Each of the switching elements M1 to M6 of the multiplexer 60 can be connected to input ends of the data lines DL1 to DL6. In the one embodiment, the subpixels R, G and B forming one unit pixel PX can be connected to one output buffer 341 or 342 through the switching elements M1 to M6. For example, the subpixels R, G and B forming one unit pixel PX can be connected to the first output buffer 341 through the first to the third switching elements M1 to M3, and the subpixels R, G and B forming the other unit pixel PX can be connected to the second output buffer 342 through the fourth to the sixth switching elements M4 to M6. However, the present embodiment is not limited thereto.

When the switching elements M1 to M6 are turned on according to the mux control signals MUX1 to MUX3, the data voltage can be applied to the data lines DL1 to DL6 connected to the corresponding switching elements M1 to M6. In more detail, when the first and the fourth switching elements M1 and M4 are turned on according to the first mux control signal MUX1, the data voltage can be applied to the subpixels R connected to the first and the fourth data lines DL1 and DL4. In addition, when the second and the fifth switching elements M2 and M5 are turned on according to the second mux control signal MUX2, the data voltage can be applied to the subpixels G connected to the second and the fifth data lines DL2 and DL5. In addition, when the third and the sixth switching elements M3 and M6 are turned on according to the third second mux control signal MUX3, the data voltage can be applied to the subpixels B connected to the third and the sixth data lines DL3 and DL6.

In the one embodiment, the switching elements M1 to M6 can be configured with transistors. In the illustrated embodiment, the switching elements M1 to M6 are nmos transistors. In this embodiment, a turn-on level of the mux control signals MUX1 to MUX3 is a high level. However, the present embodiment is not limited thereto. That is, in another embodiment, the switching elements M1 to M6 can be pmos transistors. In this embodiment, a turn-on level of the mux control signals MUX1 to MUX3 can be a low level.

Figure 3:
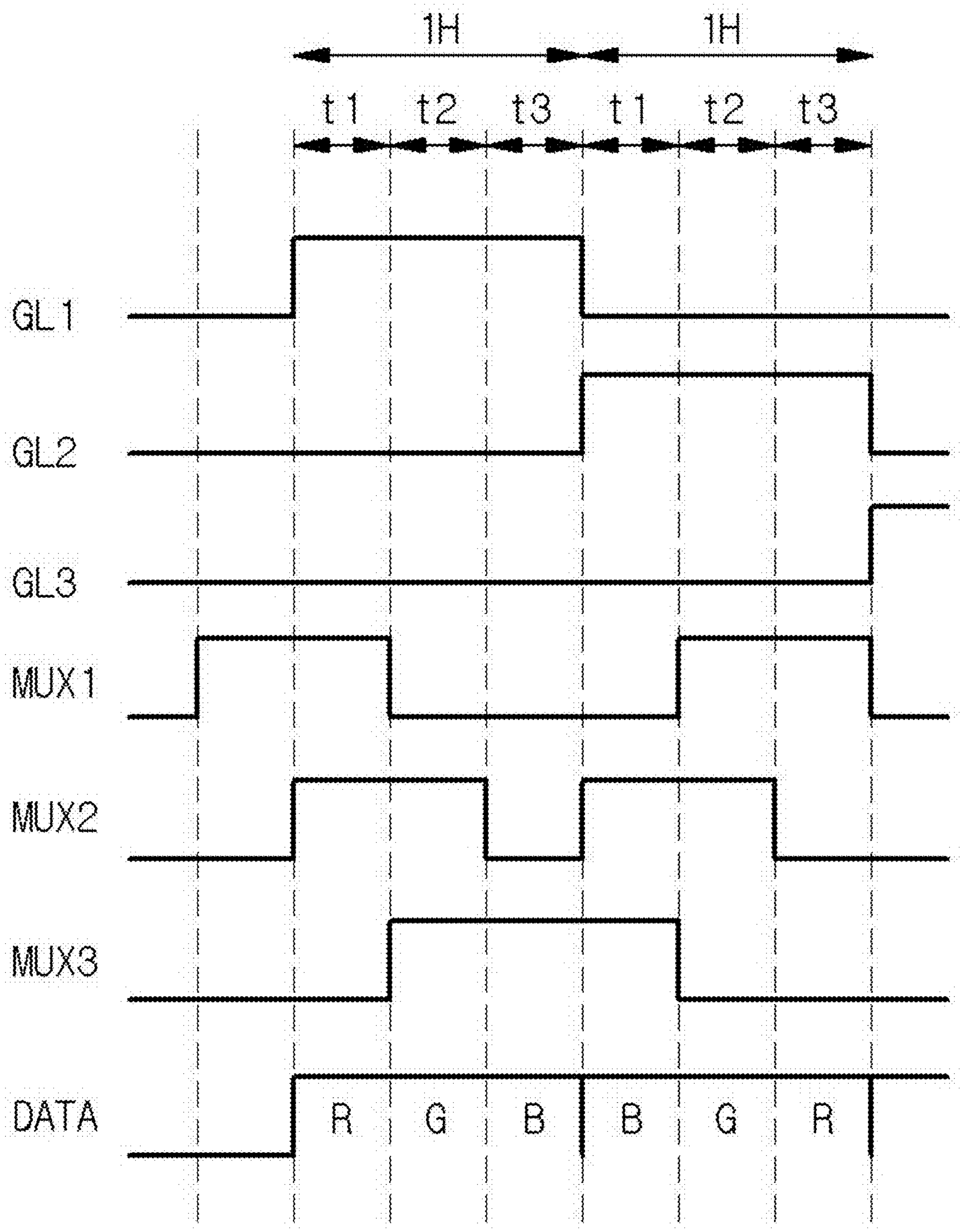
FIG. 3 is a waveform diagram of control and driving signals applied to a display device according to an embodiment of the present disclosure.

FIG. 3 is a waveform diagram of control and driving signals applied to the display device according to the one embodiment.

Referring to FIGS. 2 and 3 together, during the driving of the display device 1 (FIG. 1), the gate signals at a turn-on level are sequentially applied to the gate lines GL1 to GL3. At this time, each of the gate signals can be applied at a turn-on level during one horizontal period (1H).

Each of the output buffers 341 and 342 can sequentially output the data voltage to the subpixels R, G and B forming one pixel PX, by time-dividing one horizontal period (1H). For example, each of the output buffers 341 and 342 can output a data voltage of the first subpixel R during a first period t1 of the one horizontal period (1H), a data voltage of the second subpixel G during a second period t2 of the one horizontal period (1H), and a data voltage of the third subpixel B during a third period t3 of the one horizontal period (1H).

The timing controller 10 (FIG. 1) can provide the mux control signals MUX1 to MUX3 so that the switching elements M1 to M6 of the multiplexer 60 can be sequentially turned on during the one horizontal period (1H).

During the first period t1 of a first one horizontal period, the first mux control signal MUX1 at a turn-on level is applied to the multiplexer 60. Then, the first and the fourth switching elements M1 and M4 are turned on, and the data voltage output from the output buffers 341 and 342 can be applied to the first and the fourth subpixels R, respectively.

During the second period t2, the second mux control signal MUX2 at a turn-on level is applied to the multiplexer 60. Then, the second and the fifth switching elements M2 and M5 are turned on, and the data voltage output from the output buffers 341 and 342 can be applied to the second and the fifth subpixels R, respectively.

During the third period t3, the third mux control signal MUX3 at a turn-on level is applied to the multiplexer 60. Then, the third and the sixth switching elements M3 and M6 are turned on, and the data voltage output from the output buffers 341 and 342 can be applied to the third and the sixth subpixels R, respectively.

Meanwhile, in the embodiment of FIG. 3, the turn-on periods of the mux control signals MUX1 to MUX3 can at least partially overlap with each other. For example, the turn-on periods of the first mux control signal MUX1, and the second mux control signal MUX2 can at least partially overlap with each other, and the turn-on periods of the second mux control signal MUX2 and the third mux control signal MUX3 can at least partially overlap with each other.

In the illustrated embodiment, the second mux control signal MUX2 is output at a turn-on level before the second period t2 starts, and the third mux control signal MUX3 is output at a turn-on level before the third period t3 starts. In an example, the second mux control signal MUX2 can be output at a turn-on level at a time point when the first period t1 starts, and the third mux control signal MUX3 can be output at a turn-on level at a time point of an output of the second period t2.

When the output buffers 341 and 342 are connected to the data lines DL1 to DL6, the subpixels R, G and B connected to the data lines DL1 to DL6 and the data lines DL1 and DL6 become a load. Therefore, the data voltage output from the output buffers 341 and 342 has a certain delay time until reaching a required voltage (e.g., slew rate). For example, instead of providing a responsive square waveform, a rounded wave form may be provided. Accordingly, during each of the times t1, t2 and t3, a problem may occur that the subpixels R, G and B may not be sufficiently charged to the required data voltage (e.g., the output may take too long to reach the desired voltage level due to impaired slew rate). In the illustrated embodiment, the turn-on periods of the mux control signals MUX1 to MUX3 are extended, and therefore, the subpixels R, G and B can be charged to the required data voltage.

Meanwhile, in the one embodiment, the first mux control signal MUX1 to the third mux control signal MUX3 can be sequentially output during the first one horizontal period, and the third mux control signal MUX3 to the first mux control signal MUX1 can be sequentially output during a second one horizontal period.

In this embodiment, the third mux control signal MUX3 is continuously output from a third period t3 of the first one horizontal period to a first period t1 of the second one horizontal period. That is, the mux control signals MUX1 to MUX3 are not inverted between the one horizontal periods. The number of inversions of each of the mux control signals MUX1 to MUX3 is one time.

As a result, the overall number of transitions of the mux control signals MUX1 to MUX3 can be reduced, and accordingly, the power consumption of the multiplexer 60 can be reduced.

Figure 4:
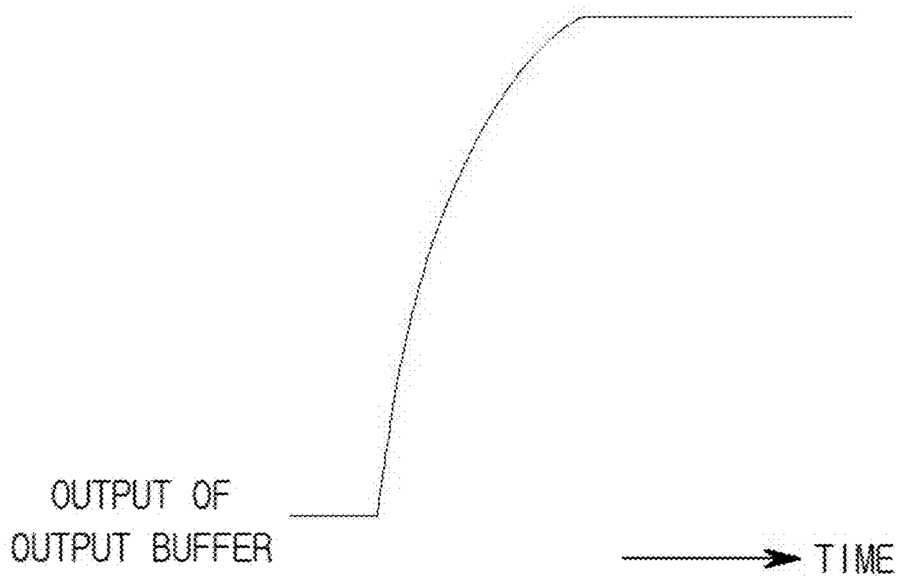
FIG. 4 is a waveform graph of an output signal of an output buffer according to an embodiment of the present disclosure.

FIG. 4 is a waveform graph of an output signal of the output buffer according to the one embodiment.

As described referring to FIG. 3, when the output buffers 341 and 342 are connected to the data lines DL1 to DL6, the subpixels R, G and B connected to the data lines DL1 to DL6 and the data lines DL1 and DL6 become a load on the multiplexer 60. Therefore, the data voltage output from the output buffers 341 and 342 may not reach the required voltage promptly, and can increase according to a certain slew rate as illustrated in FIG. 4. For example, the data voltage output from the output buffers 341 and 342 may be less responsive due to the combined load of multiple data lines being activated at the same time.

In particular, the number of the subpixels R, G and B connected to one output buffer 341 or 342 during an overlapping period of the turn-on level of the mux control signals MUX1 to MUX3 increases more than that during a non-overlapping period when the turn-on levels of the mux control signals MUX1 to MUX3 do not overlap. In other words, during the overlapping period of the mux control signals MUX1 to MUX3, the load of the each of the output buffers 341 and 342 increases. In other words, the on periods of multiple MUX control signals can be overlapped with each other in order to reduce power consumption, but this may cause the output buffers of the multiplexer to become bogged down or less responsive due to the increased load from the activated data lines, which can impair the slew rate.

As a result, during the overlapping period of the mux control signals MUX1 to MUX3, the slew rate of the data voltage output from the output buffer 341 and 342 increases, thereby deteriorating performance of the output buffers 341 and 342 (e.g., the output buffers become less responsive and output wave forms that are more rounded). Hereinafter, a detailed configuration of the data driver 30 configured to address the performance deterioration of the output buffers 341 and 342 will be described below.

Figure 5:
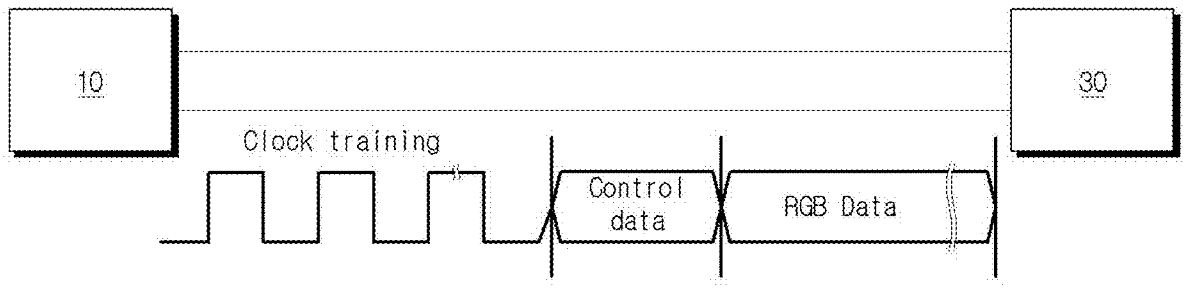
FIG. 5 is a diagram illustrating a packet structure of a data driving control signal according to an embodiment of the present disclosure.

FIG. 5 is a diagram illustrating a packet structure of the data driving control signal according to an embodiment of the present disclosure.

Referring to FIG. 5, the timing controller 10 and the data driver 30 can communicate according to an EPI protocol. According to the EPI protocol, the timing controller 10 and the data driver 30 can be connected through a pair of transmission lines to receive and transmit a signal in a digital format. The timing controller 10 can transmit a clock training pattern, control data, and RGB data sequentially to the data driver 30.

The clock training pattern is a clock signal for synchronizing operation timings of the timing controller 10 and the data driver 30 with each other, and can be a square-wave signal.

The control data is the data driving control signal CONT2 (FIG. 1), and can include information indicating the start of the control data, information indicating the start position of the RGB data, and information indicating the rising time and pulse width of the source output enable signal, etc. In addition, the control data can further include information for controlling various functions that can be implemented by the data driver 30.

The control data can indicate the above-mentioned information by using a low level or a high level. In the one embodiment, bits constituting a first control signal CTR1 of the control data can correspond to information as shown in Table 1.

TABLE 1

| Bit | CTR1 | Default | Update |
|---|---|---|---|
| 0 | CLKH | H | — |
| 1 | | H | — |
| 2 | GSP | L | Last Data |
| 3 | EQ1 | L | Last Data |
| 4 | EQ2 | L | |
| 5 | MODE | L | SOE Start |
| 6 | Reserved | L | — |
| 7 | INVC | L | SOE Start |
| 8 | PWRC1 | L | SOE Start |
| 9 | PWRC2 | L | |

In the first control signal CTR1 of Table 1, the eighth and ninth bits are power control signals PWRC1 and PWRC2 for controlling the power consumption of the data driver 30. In the one embodiment, the power management circuit provided in the data driver 30 can control the power consumption of the data driver 30 by controlling a magnitude of a bias current provided to the output buffers 341 and 342 (FIG. 2) according to the power control signals PWRC1 and PWRC2. For example, the power control signal PWR1 and the power control signal PWR2 can control the output buffers 341 and 342 to receive different power levels depending on certain situations.

In the one embodiment, the power management signals PWRC1 and PWRC2 can define a power consumption mode that corresponds to first to fourth values represented by 2-bit data. The power consumption according to the value of 2-bit data can be defined as shown in Table 2.

TABLE 2

| PWRC1 | PWRC2 | Description |
|---|---|---|
| L | L | Ultra-low power |
| L | H | Low power |
| H | L | Normal power |
| H | H | Max power |

When a first bit PWRC1 of the power control signal is applied at a low level, and a second bit PWRC2 is applied at an ultra-low level ("LL"), the data driver 30 is controlled to consume a minimum power (e.g., first mode). When the first bit PWRC1 of the power control signal is applied at a high level, and the second bit PWRC2 is applied at a high level ("HH"), the data driver 30 is controlled to consume a maximum power (e.g., fourth mode). When the first bit PWRC1 of the power control signal is applied at a low level, and the second bit PWRC2 is applied at a high level ("LH"), the data driver 30 is controlled to consume a low power (e.g., second mode). When the first bit PWRC1 of the power control signal is applied at a high level, and the second bit PWRC2 is applied at a low level ("HL"), the data driver 30 is controlled to consume a commercial power (e.g., third mode).

When the power consumption mode is a low power mode, a magnitude of the bias current provided to the output buffers 341 and 342 of the data driver 30 can become smaller, and on contrary, when the power consumption mode is a high power mode, a magnitude of the bias current provided to the output buffers 341 and 342 can become greater. For example, as it gets closer to the first mode, a low bias current can be provided to the output buffers 341 and 342, and as it gets closer to the fourth mode, a high bias current can be provided to the output buffers 341 and 342.

The power consumption of the output buffers 341 and 342 is proportional to a magnitude of the bias current provided to the output buffers 341 and 342. For example, when a low bias current is provided in the low power mode, the power consumption of the output buffers 341 and 342 decreases, and when a high bias current is provided in the high power mode, the power consumption of the output buffers 341 and 342 increases. As such, the data driver 30 can reduce the power consumption by variably controlling the power consumption of the data driver 30 according to a value set by the power control signals PWRC1 and PWRC2. In other words, the data driver 30 can dynamically adjust the power consumption of the multiplexer 60.

In addition, the increase of the power consumption of the output buffers 341 and 342 temporarily improves the output performance of the output buffers 341 and 342, and can allow the data signal output from the output buffer 34 reach the desired voltage faster. For example, when the output buffers 341 and 342 are supplied with a higher power level, they can become more responsive and have an improved slew rate. Therefore, by dynamically controlling or adjusting the power consumption of the output buffers 341 and 342, it is possible to change and improve the slew rate of the output buffers 341 and 342 when desirable, while also reducing power consumption.

The RGB data can include a plurality of grayscale data corresponding to images to be displayed.

Figure 6:
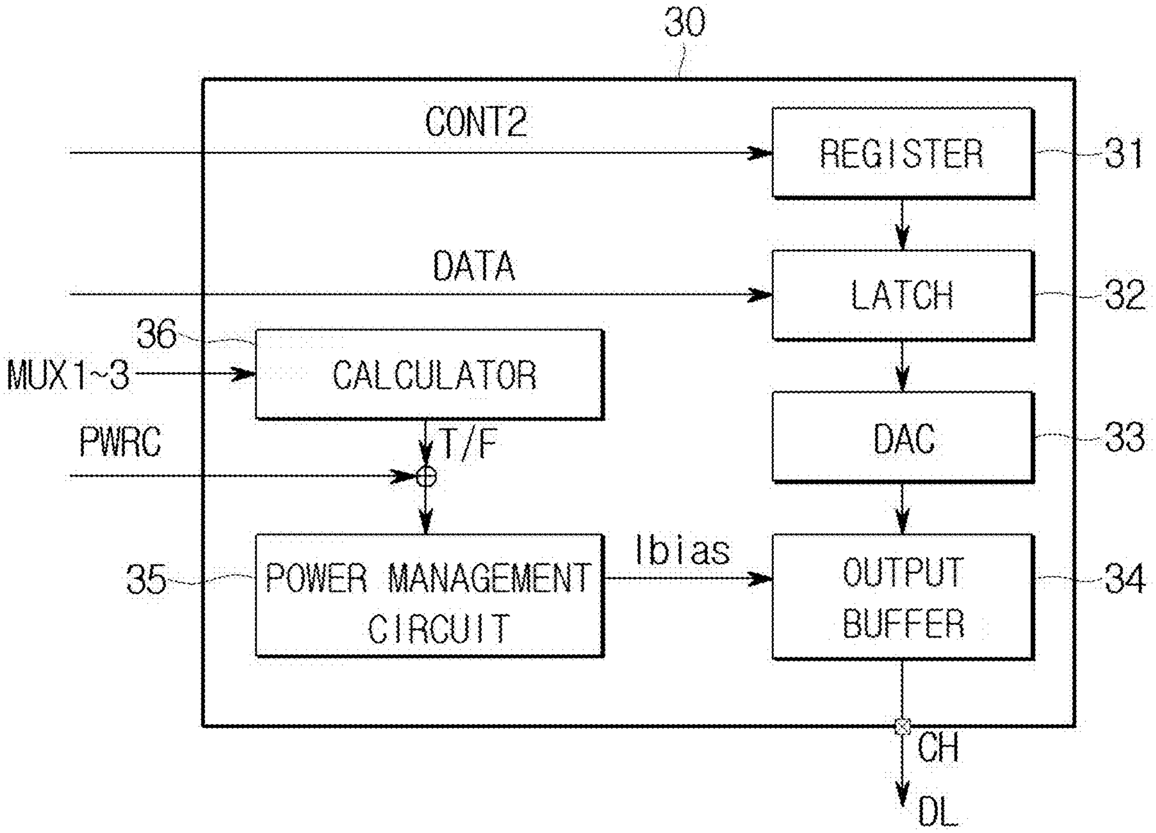
FIG. 6 is a block diagram illustrating a configuration of a data driver according to an embodiment of the present disclosure.

FIG. 6 is a block diagram illustrating a configuration of the data driver according to an embodiment of the present disclosure.

Referring to FIG. 6, the data driver 30 can include a register 31, a latch 32, a digital to analog converting part 33 (DAC), the output buffer 34, and the power management circuit 35.

The register 31 can generate a sampling signal using the data driving control signal CONT2 received from the timing controller 10 (FIG. 5), and provide the generated sampling signal to the latch 32.

The latch 32 can latch the image data DATA received from the timing controller 10, and output the image data DATA to the digital to analog converting part 33 (DAC) in response to the sampling signal received from the register 31.

The digital to analog converting part 33 (DAC) can convert the image data DATA received from the latch 32 into a gamma compensation voltage to generate a data voltage.

The output buffer 34 can output the data voltage output from the digital to analog converting part 33 to the data line DL through a channel CH according to the source output enable (SOE) signal received from the timing controller 10.

The power management circuit 35 can generate a bias voltage for providing a bias current Ibias based on the power control signal PWRC described referring to FIG. 5, and apply the bias current Ibias to the output buffer 34. A magnitude of the bias current Ibias can change according to the power consumption mode directed by the power control signal PWRC etc.

In detail, in the power consumption modes described referring to FIG. 2, when the power consumption mode is a low power mode, a magnitude of the bias current Ibias provided to the output buffer 34 can become smaller, and on contrary, when the power consumption mode is a high power mode, a magnitude of the bias current Ibias provided to the output buffer 34 can become greater. For example, as the power level gets closer to the first mode, a low bias current Ibias is provided to the output buffer 34, and as the power level gets closer to the fourth mode, a high bias current Ibias is provided to the output buffer 34.

The output buffer 34 can amplify the data voltage based on the bias current Ibias provided from the power management circuit 35, and can output the amplified data voltage to the data line DL. At this time, according to a magnitude of the voltage output from the output buffer 34, the power consumption of the output buffer 34 and the power consumption of the data driver 30 can be adjusted. In addition, the power consumption of the output buffer 34 can be further adjusted in proportion to a magnitude of the bias current Ibias provided to the output buffer 34. For example, when a low bias current Ibias is provided in the low power mode, the power consumption of the output buffer 34 decreases, and when a high bias current Ibias is provided in the high power mode, the power consumption of the output buffer 34 increases.

The data driver 30 according to the one embodiment is configured such that the described power consumption is adjusted even further (to be changed) according to whether there are overlapping or non-overlapping turn-on periods of the mux control signals MUX1 to MUX 3. To this end, the data driver 30 can further include a calculator 36. The calculator 36 can also be referred to as a calculator circuit, a controller, or an overlapping mux signal determining part, but embodiments are not limited thereto.

The calculator 36 can generate a certain logic signal T/F from the mux control signals MUX1 to MUX3 applied from the timing controller 10, and output them. In detail, the calculator 36 can output a logic signal T/F at a different level according to overlap or non-overlap of the turn-on levels of the mux control signals MUX1 to MUX3. For example, the calculator 36 can output "true" when two more mux control signals overlap with each other (e.g., indicating a situation that could impair slew rate, during which the power level can be temporarily increased to avoid any impairment in the slew rate), and the calculator 36 can output "false" when there are no overlapping mux control signals.

For example, the calculator 36 can output a logic signal T/F at a first level (e.g., a high level) when at least two of the mux control signals MUX1 to MUX3 are at a turn-on level, that is, when the turn-on levels of at least two mux control signals MUX1 to MUX3 overlap with each other. In addition, the calculator 36 can output a logic signal T/F at a second level (e.g., a low level) different than the first level, when only one mux control signal among the mux control signals MUX1 to MUX3 is at a turn-on level, that is, when the turn-on levels of the mux control signals MUX1 to MUX3 do not overlap with each other.

In addition, the logic signal T/F output from the calculator 36 can be combined with the power control signal PWRC, and then, provided to the power management circuit 35. For example, the power control signal PWRC and the logic signal T/F can be combined through a logical sum, and provided to the power management circuit 35. Here, the power control signal PWRC and the logic signal T/F are digital data, and are logically summed in a manner of adding two binary numbers.

In Table 2, when the power control signal PWRC is "LL", if the logic signal T/F at a high level is added, a result of the logical sum is "LH". When the power control signal PWRC is "LH", if the logic signal T/F at a high level is added, a result of the logical sum is "HL". When the power control signal PWRC is "HL", if the logic signal T/F at a high level is added, a result of the logical sum is "HH". When the power control signal PWRC is "HH", if the logic signal T/F at a high level is added, a result of the logical sum can be still "HH" because of limitation to number of bits. When the logic signal T/F is at a low level, a result of the logical sum has the original value of the power control signal PWRC. In this way, a finer granularity of control can be provided for different power levels.

The described results of the logical sum of the power control signal PWRC and the logic signal T/F can be represented in Table 3 below.

TABLE 3

| PWRC | T/F | Logical sum |
|---|---|---|
| LL | H | LH |
| LH | H | HL |
| HL | H | HH |
| HH | H | HH |
| LL | L | LL |
| LH | L | LH |
| HL | L | HL |
| HH | L | HH |

As a result, when at least two of the mux control signals MUX1 to MUX3 are at a turn-on period, that is, when the turn-on periods of at least two mux control signals MUX1 to Mux3 overlap with each other, the power consumption mode directed by the power control signal PWRC is adjusted up to the power consumption mode consuming more power through the logical sum with the logic signal T/F.

The power management circuit 35 generates the bias current Ibias based on a combination signal of the power control signal PWRC and the logic signal T/F. A magnitude of the generated bias current Ibias is determined in response to the combination signal. That is, the magnitude of the generated bias current Ibias can be further adjusted by the logic signal T/F.

In the above-described embodiment, the adjustment in the power mode by the logic signal T/F increases power consumption of the output buffer 34. The increase of the power consumption improves the output performance of the output buffer 34 temporarily, and makes the data signal output from the output buffer 34 reach the required voltage faster (e.g., allows the output buffers to be temporarily more responsive). Therefore, when the load of the output buffer 34 increases temporarily because of the overlapping operation of the mux control signals MUX1 to MUX3, the slew rate of the output buffer 34 can be improved or compensated.

In addition, in the above-described embodiment, the power consumption of the output buffer 34 increases temporarily only during the overlapping operation of the mux control signals MUX1 to MUX3, therefore, it is possible to minimize the increase of the overall power consumption of the data driver 30 and improve the performance of the output buffer 34. In other words, the performance of the output buffer 34 can be temporarily boosted as needed while keeping overall power consumption at a minimum.

Figure 7:
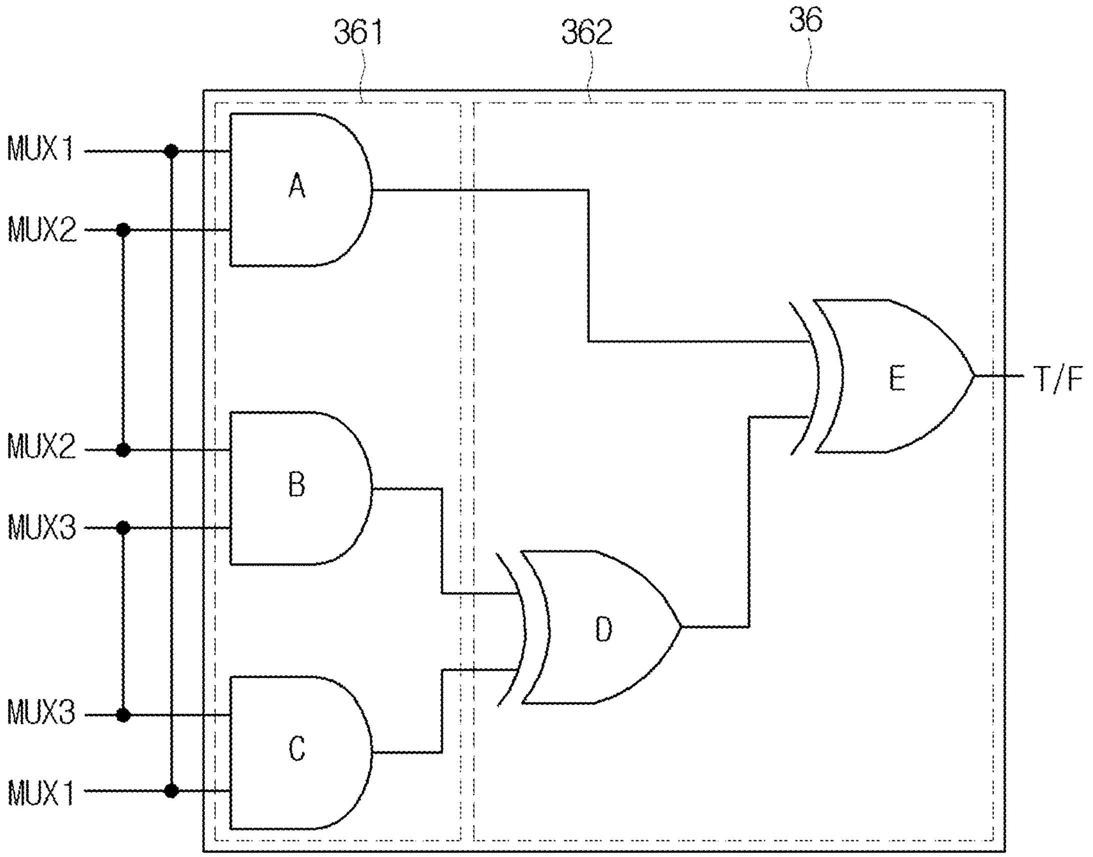
FIG. 7 is a circuit diagram illustrating a configuration of a calculator according to an embodiment of the present disclosure.
Figure 8:
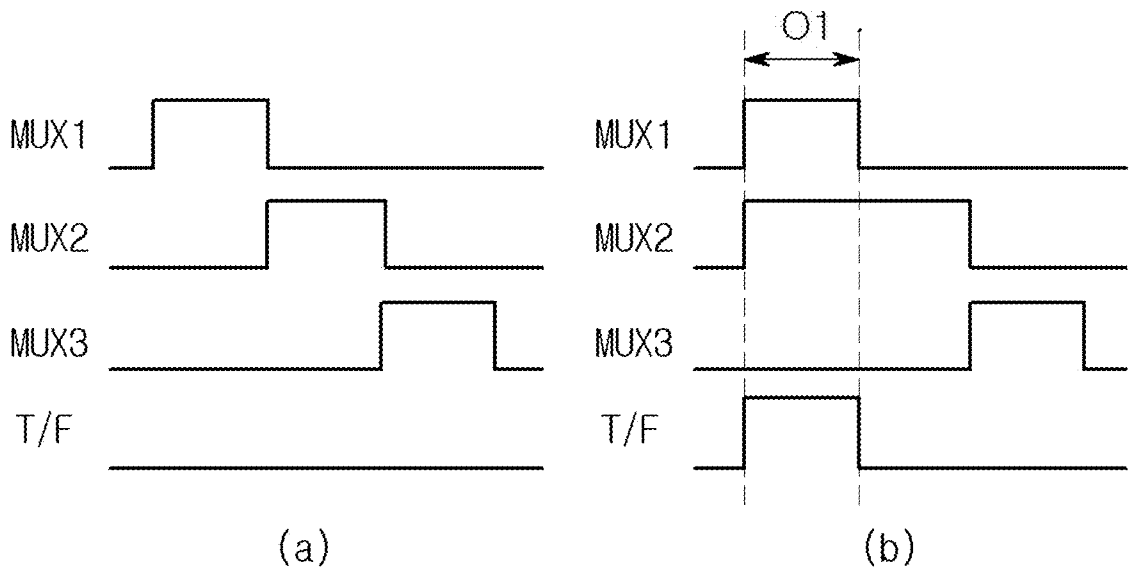
FIG. 8, including parts (a) and (b), are waveform diagrams illustrating examples of input and output signals of a calculator illustrated in FIG. 7 according to an embodiment of the present disclosure.

FIG. 7 is a circuit diagram illustrating a configuration of the calculator according to an embodiment, and FIG. 8 are waveform diagrams illustrating examples of input and output signals of the calculator illustrated in FIG. 7.

Referring to FIG. 7, the calculator 36 is configured to receive the mux control signals MUX1 to MUX3. In addition, the calculator 36 can be configured to output the logic signal T/F generated from the mux control signals MUX1 to MUX3 through a certain logical operation.

In more detail, when at least two mux control signals MUX1 to MUX3 among the mux control signals MUX1 to MUX3 have the turn-on level, the calculator 36 can be configured to output the logic signal T/F corresponding to that, e.g., a logic high signal 'H' (hereinafter, referred to as '1' for convenience of description) (or a logic low signal 'L' (hereinafter, referred to as '0' for convenience of description)). That is, the calculator 36 outputs the logic high signal in an overlapping state in which at least two mux control signals MUX1 to MUX3 have the turn-on level. In a non-overlapping state in which at least two of the mux control signals MUX1 to MUX3 do not have the turn-on level, a second logic gate 4622 outputs a logic low signal, but embodiments are not limited there to. According to an embodiment, the calculator 36 can output a logical low 'L' when at least two mux control signals overlap with each other, and can output a logical high 'H' when none of the mux control signals overlap with each other.

When the switching elements M1 to M6 (FIG. 2) of the multiplexer 60 (FIG. 2) are configured with nmos transistors, the turn-on level is set as a high level. That is, the calculator 36 can be configured to output a logic high signal when at least two of the mux control signals MUX1 to MUX3 have the high level. To this end, the calculator 36 can include a first logic gate group 361 and a second logic gate group 362.

The first logic gate group 361 can be configured to output a logic high signal when all the compared mux control signals MUX1 to MUX3 have a high level, by comparing the mux control signals MUX1 to MUX3 sequentially. The first logic gate group 361 can include an AND gate.

The AND gate can output a logic high signal when two mux control signals MUX1 to MUX3 of the mux control signals MUX1 to MUX3 are received, and both of the two received mux control signals MUX1 to MUX3 have the high level. Such an AND gate can be provided in plurality so that all the possible combinations of the mux control signals MUX1 to MUX3 can be selected and logically calculated. When the multiplexer 60 is operated with three mux control signals MUX1 to MUX3, three AND gates can be provided as illustrated.

For example, a first AND gate A receives the first and the second mux control signals MUX1 and MUX2, and when both the first and the second mux control signals MUX1 and MUX2 are the high level, the first AND gate A outputs a logic high signal ('1'), and when both the first and the second mux control signals MUX1 and MUX2 are not the high level, the first AND gate A outputs a logic low signal ('0'). A second AND gate B receives the second and the third mux control signals MUX2 and MUX3, and when both the second and the third mux control signals MUX2 and MUX3 are the high level, the second AND gate B outputs a logic high signal ('1'), and when both the second and the third mux control signals MUX2 and MUX3 are not the high level, the second AND gate B outputs a logic low signal ('0'). A third AND gate C receives the third and the first mux control signals MUX3 and MUX1, and when both the third and the first mux control signals MUX3 and MUX1 are the high level, the third AND gate C outputs a logic high signal ('1'), and when both the third and the first mux control signals MUX3 and MUX1 are not the high level, the third AND gate C outputs a logic low signal ('0').

The second logic gate group 362 outputs a logic high signal ('1') when at least one among the logic signals output from the first logic gate group 361 is a logic high signal ('1'). The second logic gate group 362 can be configured as an XOR gate which receives two logic signals, and outputs a logic low signal ('0') when the two received logic signals have the same logic level, and outputs a logic high signal ('1') when the two received logic signals have different logic levels.

The XOR gate can be provided in plurality so that all the possible combinations of the logic signals can be selected and logically calculated. When the first logic gate group 361 is configured with three AND gates, two XOR gates can be provided as illustrated.

For example, the first XOR gate D receives the logic signals output from the second and the third AND gates B and C, and outputs a logic low signal ('0') when the logic signals output from the second and the third AND gates B and C have the same logic level, and outputs a logic high signal ('1') when the logic signals output from the second and the third AND gates B and C have different logic levels. The second XOR gate E receives the logic signals output from the first XOR gate D and the first AND gate A, and outputs a logic low signal ('0') when both the logic signals output from the first XOR gate D and the first AND gate A have the same logic level, and outputs a logic high signal ('1') when both the logic signals output from the first XOR gate D and the first AND gate A have different logic levels.

Every possible case which can be generated in the calculator 36 can be represented in a logic table as in Table 4.

TABLE 4

| Case | MUX1 | MUX2 | MUX3 | A | B | C | D | E (T/F) | Overlapping state |
|---|---|---|---|---|---|---|---|---|---|
| 1 | 1 | 0 | 0 | 0 | 0 | 0 | 1 | 0 | None |
| 2 | 1 | 1 | 0 | 1 | 0 | 0 | 1 | 1 | MUX1, 2 |
| 3 | 1 | 0 | 1 | 0 | 0 | 1 | 1 | 1 | MUX1, 3 |
| 4 | 0 | 1 | 0 | 0 | 0 | 1 | 1 | 0 | None |
| 5 | 0 | 1 | 1 | 0 | 1 | 0 | 1 | 1 | MUX2, 3 |
| 6 | 0 | 0 | 1 | 0 | 0 | 0 | 0 | 0 | None |
| 7 | 1 | 1 | 1 | 1 | 1 | 1 | 0 | 1 | MUX1, 2, 3 |
| 8 | 0 | 0 | 0 | 0 | 0 | 0 | 0 | 0 | None |

As represented in Table 4, the calculator 36 outputs a logic signal T/F of a logic high level ('1') when at least two of the mux control signals MUX1 to MUX3 of the mux control signals MUX1 to MUX3 are in the high level, that is, at least two turn-on periods overlap with each other.

As illustrated in the embodiment in FIG. 8, when the turn-on periods of the mux control signals MUX1 to MUX3 do not overlap as in part (a), the calculator 36 can output a logic low signal. On contrary, as illustrated in the embodiment in FIG. 8, the calculator 36 can output a logic high signal during a period (O1) when the turn-on periods of two mux control signals MUX1 and MUX2 among the mux control signals MUX1 to MUX3 overlap with each other as in part (b) of FIG. 8.

Figure 9:
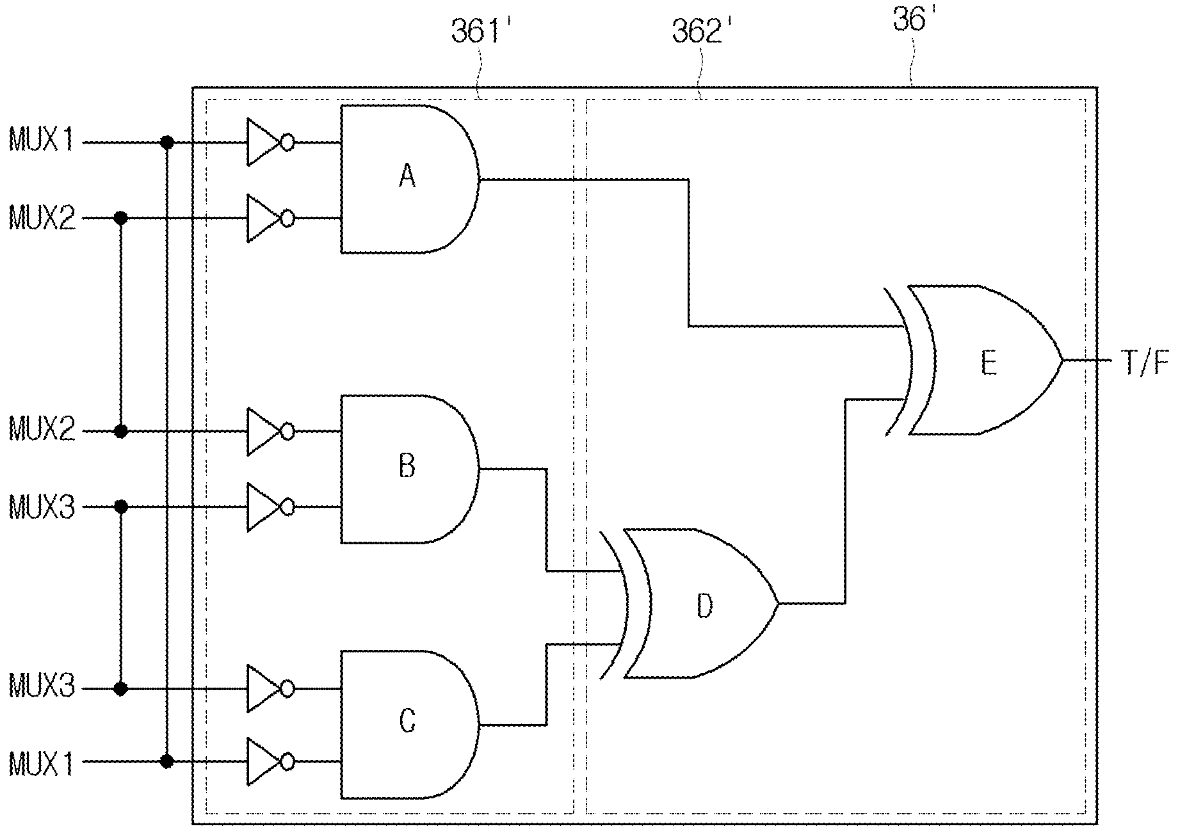
FIG. 9 is a circuit diagram illustrating a configuration of a calculator according to another embodiment of the present disclosure.
Figure 10:
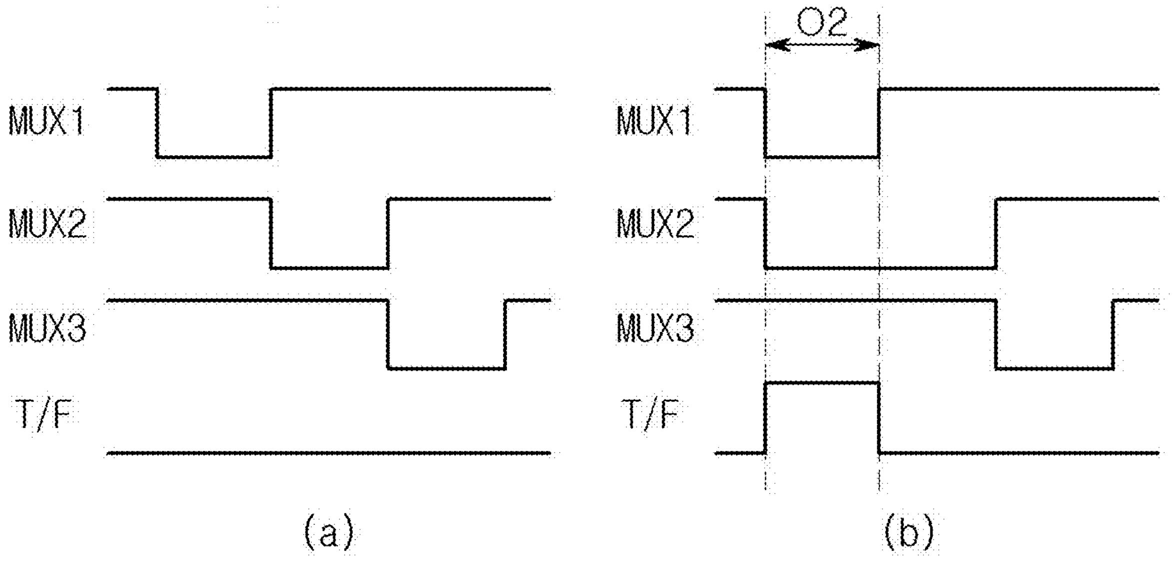
FIG. 10, including parts (a) and (b), are waveform diagrams illustrating examples of input and output signals of the calculator illustrated in FIG. 9 according to an embodiment of the present disclosure.

FIG. 9 is a circuit diagram illustrating a configuration of a calculator according to another embodiment, and FIG. 10 are waveform diagrams illustrating examples of input and output signals of the calculator illustrated in FIG. 9.

Referring to FIG. 9, a calculator 36' is configured to receive the mux control signals MUX1 to MUX3 (FIG. 3). In addition, the calculator 36' can be configured to output a logic signal T/F generated from the mux control signals MUX1 to MUX3 through a certain logical operation. For example, the configuration of calculator 36' in FIG. 9 is the same as the configuration of calculator 36 in FIG. 7, except that each of the inputs of the AND gates in the first logic gate group 361' is connected to an inverter (e.g., a NOT gate).

In more detail, when at least two mux control signals MUX1 to MUX3 among the mux control signals MUX1 to MUX3 have the turn-on level, the calculator 36' can be configured to output the logic signal T/F corresponding to that, e.g., a logic high signal (or a logic low signal). That is, the calculator 36' outputs the logic high signal in an overlapping state in which at least two mux control signals MUX1 to MUX3 have the turn-on level. In a non-overlapping state in which at least two of the mux control signals MUX1 to MUX3 do not have the turn-on level, the second logic gate 4622 outputs a logic low signal (or a logic high signal).

When the switching elements M1 to M6 (FIG. 2) of the multiplexer 60 (FIG. 2) are configured with pmos transistors, the turn-on level is set as a low level. That is, the calculator 36' can be configured to output a logic high signal when at least two of the mux control signals MUX1 to MUX3 have the low level. To this end, the calculator 36' can include a first logic gate group 361' and a second logic gate group 362'.

The first logic gate group 361' can be configured to output a logic high signal when both two among the mux control signals MUX1 to MUX3 selected randomly have a low level. The first logic gate group 361' can include a NOT gate and an AND gate.

The NOT gate can invert logic levels of the mux control signals MUX1 to MUX3 and output the inverted signals. That is, the NOT gate receives each of the mux control signals MUX1 to MUX3, and when the received mux control signals MUX1 to MUX3 are a high level, the NOT gate outputs a low level signal, and when the received mux control signals MUX1 to MUX3 is a low level, the NOT gate outputs a high level signal. The NOT gate can be provided in plurality so that all the mux control signals MUX1 to MUX3 can be inverted and be output.

The AND gate can be configured with the AND gate and the NOT gate configured to receive two among the mux control signals MUX1 to MUX3 inverted through the NOT gate, and output a logic high signal when all the two received mux control signals MUX1 to MUX3 have a high level.

The AND gate can be provided in plurality so that all the possible combinations of the mux control signals MUX1 to MUX3 can be selected and logically calculated. When the multiplexer 60 is operated with three mux control signals MUX1 to MUX3, three AND gates can be provided as illustrated.

For example, a first AND gate A receives the first and the second mux control signals MUX1 and MUX2, and when both the first and the second mux control signals MUX1 and MUX2 are the high level, the first AND gate A outputs a logic high signal ('1'), and when both the first and the second mux control signals MUX1 and MUX2 are not the high level, the first AND gate A outputs a logic low signal ('0'). A second AND gate B receives the second and the third mux control signals MUX2 and MUX3, and when both the second and the third mux control signals MUX2 and MUX3 are the high level, the second AND gate B outputs a logic high signal ('1'), and when both the second and the third mux control signals MUX2 and MUX3 are not the high level, the second AND gate B outputs a logic low signal ('0'). A third AND gate C receives the third and the first mux control signals MUX3 and MUX1, and when both the third and the first mux control signals MUX3 and MUX1 are the high level, the third AND gate C outputs a logic high signal ('1'), and when both the third and the first mux control signals MUX3 and MUX1 are not the high level, the third AND gate C outputs a logic low signal ('0').

The second logic gate group 362' outputs a logic high signal ('1') when at least one among the logic signals output from the first logic gate group 361 is a logic high signal ('1'). The second logic gate group 362' can be configured as an XOR gate which receives two logic signals, and outputs a logic low signal ('0') when the two received logic signals have the same logic level, and outputs a logic high signal ('1') when the two received logic signals have different logic levels.

The XOR gate can be provided in plurality so that all the possible combinations of the logic signals can be selected and logically calculated. When the first logic gate group 361' is configured with three AND gates, two XOR gates can be provided as illustrated.

For example, the first XOR gate D receives the logic signals output from the second and the third AND gates B and C, and outputs a logic low signal ('0') when the logic signals output from the second and the third AND gates B and C have the same logic level, and outputs a logic high signal ('1') when the logic signals output from the second and the third AND gates B and C have different logic levels. The second XOR gate E receives the logic signals output from the first XOR gate D and the first AND gate A, and outputs a logic low signal ('0') when both the logic signals output from the first XOR gate D and the first AND gate A have the same logic level, and outputs a logic high signal ('1') when both the logic signals output from the first XOR gate D and the first AND gate A have different logic levels.

Every possible case which can be generated in the calculator 36' can be represented in a logic table as in Table 5.

TABLE 5

| Case | MUX1 | MUX2 | MUX3 | A | B | C | D | E (T/F) | Overlapping state |
|---|---|---|---|---|---|---|---|---|---|
| 1 | 0 | 1 | 1 | 0 | 0 | 0 | 1 | 0 | None |
| 2 | 0 | 0 | 1 | 1 | 0 | 0 | 1 | 1 | MUX1, 2 |
| 3 | 0 | 1 | 0 | 0 | 0 | 1 | 1 | 1 | MUX1, 3 |
| 4 | 1 | 0 | 1 | 0 | 0 | 1 | 1 | 0 | None |
| 5 | 1 | 0 | 0 | 0 | 1 | 0 | 1 | 1 | MUX2, 3 |
| 6 | 1 | 1 | 0 | 0 | 0 | 0 | 0 | 0 | None |
| 7 | 0 | 0 | 0 | 1 | 1 | 1 | 0 | 1 | MUX1, 2, 3 |
| 8 | 1 | 1 | 1 | 0 | 0 | 0 | 0 | 0 | None |

As represented in Table 5, the calculator 36' outputs a logic signal T/F of a logic high level ('1') when at least two of the mux control signals MUX1 to MUX3 of the mux control signals MUX1 to MUX3 are in the low level, that is, at least two turn-on periods overlap with each other.

As illustrated in the embodiment in FIG. 10, when the turn-on periods of the mux control signals MUX1 to MUX3 do not overlap as in part (a), the calculator 36' can output a logic low signal. On contrary, as illustrated in the embodiment in FIG. 10, the calculator 36' can output a logic high signal during a period (O2) when the turn-on periods of two mux control signals MUX1 and MUX2 among the mux control signals MUX1 to MUX3 overlap with each other as in part (b) of FIG. 10.

Figure 11:
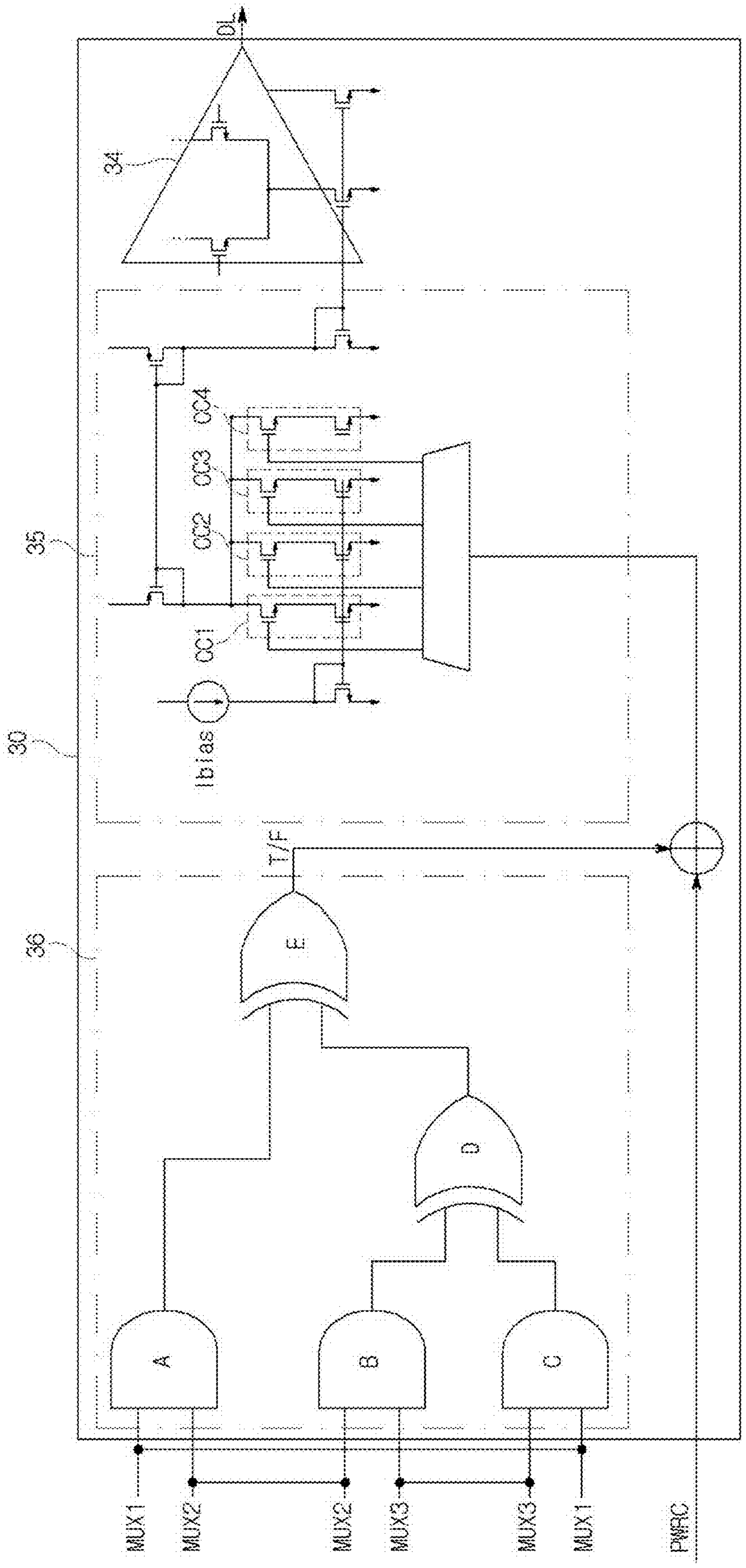
FIG. 11 is a circuit diagram illustrating a connection relation of a calculator, a power management circuit and an output buffer according to an embodiment of the present disclosure.

FIG. 11 is a circuit diagram illustrating a connection relation of the calculator, the power management circuit and the output buffer according to an embodiment of the present disclosure.

Referring to FIG. 11, the data driver 30 can receive the power control signal PWRC from the timing controller 10 (FIG. 5). The power control signal PWRC can be combined with the logic signal T/F output from the calculator 36 and provided to the power management circuit 35.

The power management circuit 35 can receive the bias current Ibias from an external current source etc. A plurality of current management circuits CC1 to CC4 change a magnitude of the bias current Ibias in response to the combination signal of the power control signal PWRC and the logic signal T/F. The plurality of current management circuits CC1 to CC4 provide the bias current Ibias, of which the magnitude is changed, to the output buffer 34.

The combination signal can be configured with four kinds of signals LL to HH as illustrated. Each of the signals LL, LH, HL and HH corresponds to four different power consumption modes, and can turn on one of the current management circuits CC1, CC2, CC3 and CC4. In more detail, a first current management circuit CC1 is turned on according to a first signal "LL" in the first mode, a second current management circuit CC2 is turned on according to a second signal "LH" in the second mode, a third current management circuit CC3 is turned on according to a third signal "HL" in the third mode, and a fourth current management circuit CC4 is turned on according to a fourth signal "HH" in the fourth mode.

The bias current Ibias can be amplified as many times as the number of the current management circuits CC1 to CC4 which are turned on, and be output.

The output buffer 34 can amplify the data voltage based on the bias current Ibias provided from the power management circuit 35, and can output the amplified data voltage. At this time, according to a magnitude of the voltage output from the output buffer 34, the power consumption of the output buffer 34 and the power consumption of the data driver 30 can be dynamically adjusted.

Figure 12:
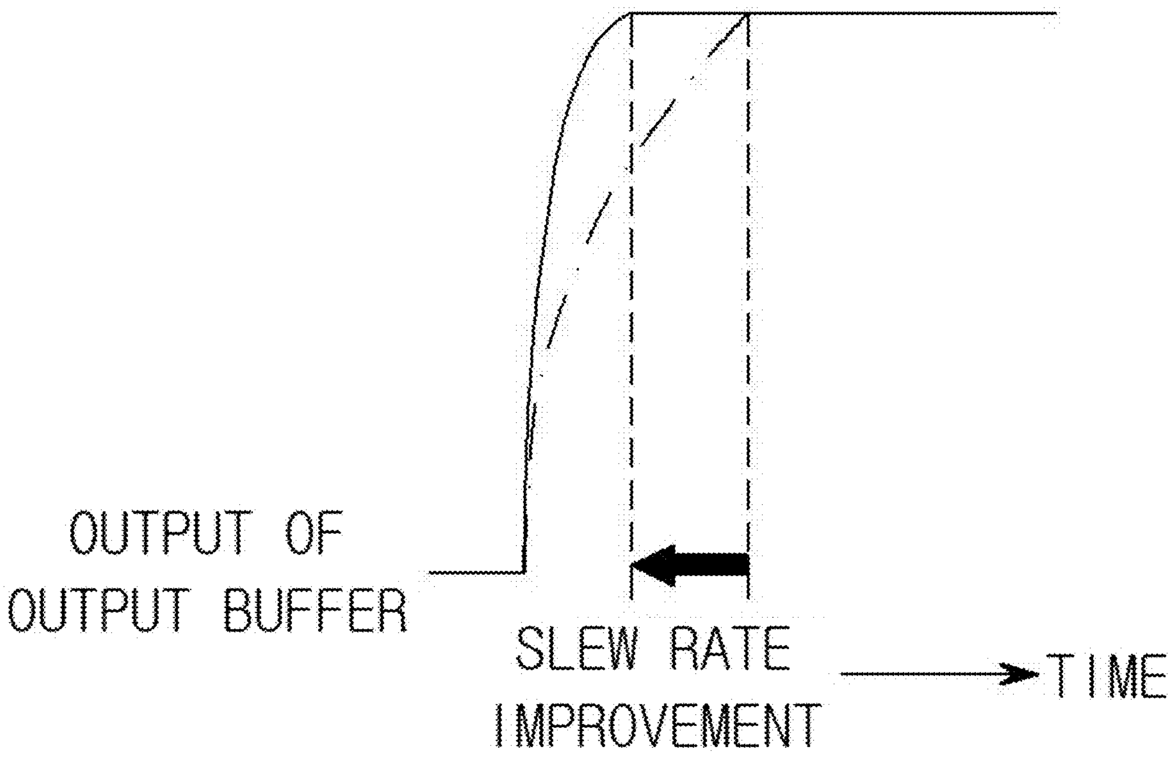
FIG. 12 is a graph illustrating an effect of improving a slew rate of an output buffer according to an embodiment of the present disclosure.

FIG. 12 is a graph illustrating an effect of improving a slew rate of the output buffer according to an embodiment of the present disclosure.

In the embodiment illustrated in FIG. 11, the combination signal of the power control signal PWRC and the logic signal T/F are applied in the output buffer 34, and as described above, in the overlapping section of the mux control signals MUX1 to MUX3, the power consumption mode directed by the power control signal PWRC is adjusted by one step higher according to the combination of the logic signal T/F. That is, in the overlapping section of the mux control signals MUX1 to MUX3, the output buffer 34 can output a data voltage using a greater power consumption for a temporary amount of time as needed. This makes the data voltage reach the required voltage faster as illustrated in FIG. 12. For example, the slew rate of the output buffer is improved and the output buffer can more quickly transition from one voltage level another.

As a result, when the load of the output buffer 34 is temporarily increased by the overlapping driving of the mux control signals MUX1 to MUX3, the embodiments can increase the power consumption of the output buffer 34 and temporarily improve the performance of the output buffer 34. Accordingly, the embodiments increase the speed of the increase in the voltage output from the output buffer 34 and improve the slew rate. In other words, the performance of the output buffer 34 can be temporarily boosted as needed, so that can be more responsive when the load is increased, and overall power consumption can be kept to a minimum.

From the foregoing description of the embodiments with reference to accompanying drawings, those skilled in the art to which this invention pertains can understand that the present invention can be embodied in other specific forms without changing the technical spirit or essential characteristics of the invention. In this connection, the above-described embodiments should be understood as examples and as not limiting in all aspects. The scope of the present disclosure is represented by the appended claims, rather than the foregoing detailed description. In addition, all changes or modified forms derived from the meaning and range of the appended claims and the equivalents thereof are included in the scope of the present disclosure.

What is claimed is:

1. A display device, comprising:

a display panel including a plurality of subpixels;

a data driver configured to supply a data voltage to the plurality of subpixels through a plurality of data lines; and a multiplexer connected between the data driver and the plurality of data lines, the multiplexer including a plurality of switching elements controlled by a plurality of mux control signals, wherein a power consumption mode of the data driver is configured to change based on whether turn-on periods of the plurality of mux control signals overlap with each other, wherein the data driver includes a calculator configured to output a logic signal, and wherein the data driver is configured to temporarily increase power consumption by increasing a bias current in response to the calculator outputting the logic signal at a first level triggered by the turn-on periods of at least two of the plurality of mux control signals overlapping with each other.

2. The display device of claim 1, wherein the data driver further includes:

a power management circuit configured to output the bias current based on a combination of a power control signal directing the power consumption mode of the data driver and the logic signal output by the calculator; and an output buffer configured to amplify the data voltage based on the bias current to output an amplified data voltage to one or more of the plurality of data lines.

3. The display device of claim 2, wherein the calculator is further configured to:

in response to only one mux control signal among the plurality of mux control signals being at the turn-on level while remaining mux control signals among the plurality of mux control signals are at a turn-off level, output the logic signal at a second level different than the first level.

4. The display device of claim 3, wherein the calculator includes:

a first logic gate group configured to compare the plurality of mux control signals, and output logic high signals when all the plurality of mux control signals are at a high level; and a second logic gate group configured to output the logic signal at the first level when at least one logic signal among logic signals output from the first logic gate group is the logic high signal.

5. The display device of claim 4, wherein the first logic gate group includes:

an AND gate configured to receive two mux control signals among the plurality of mux control signals and output the logic high signal when both of the two mux control signals are at the high level.

6. The display device of claim 5, wherein the second logic gate group includes:

an XOR gate configured to receive two logic signals among the logic signals output from the first logic gate group and output the logic high signal when the two logic signals have different logic levels.

7. The display device of claim 5, wherein the first logic gate group further includes:

a NOT gate configured to invert a logic level of one of the plurality of mux control signals to output an inverted signal.

8. The display device of claim 3, wherein the power control signal is logically summed with the logic signal to generate a combined signal and the combined signal is provided to the power management circuit.

9. The display device of claim 8, wherein the power consumption mode is changed by the power control signal to increase power consumption of the data driver based on the combined signal.

10. The display device of claim 9, wherein the power management circuit is configured to change a magnitude of the bias current based on a change of the power consumption mode.

11. A data driver, comprising:

a register configured to generate a sampling signal based on a data driving control signal;

a latch configured to latch image data and output the image data in response to the sampling signal;

a digital to analog converter configured to convert the image data, which is a digital signal output from the latch into a gamma compensation voltage, which is an analog signal for generating a data voltage;

a calculator configured to output a logic signal at a different levels based on overlapping or non-overlapping of turn-on periods of a plurality of mux control signals;

a power management circuit configured to output a bias current based on a combination of a power control signal directing a power consumption mode and the logic signal; and an output buffer configured to amplify the data voltage based on the bias current to generate an amplified data voltage, wherein the power management circuit is configured to temporarily increase power consumption by increasing the bias current in response to the calculator outputting the logic signal at a first level triggered by the turn-on periods of at least two of the plurality of mux control signals overlapping with each other.

12. The data driver of claim 11, wherein the calculator is further configured to:

in response to only one mux control signal among the plurality of mux control signals being at the turn-on level while remaining mux control signals among the plurality of mux control signals are at a turn-off level, output the logic signal at a second level different than the first level.

13. The data driver of claim 12, wherein the calculator includes:

a first logic gate group configured to compare the plurality of mux control signals, and output logic high signals when all the plurality of mux control signals are at a high level; and a second logic gate group configured to output the logic signal at the first level when at least one logic signal among logic signals output from the first logic gate group is the logic high signal.

14. The data driver of claim 13, wherein the first logic gate group includes:

an AND gate configured to receive two mux control signals among the plurality of mux control signals and output the logic high signal when both of the two mux control signals are at the high level.

15. The data driver of claim 14, wherein the second logic gate group includes:

an XOR gate configured to receive two logic signals among the logic signals output from the first logic gate group and output the logic high signal when the two logic signals have different logic levels.

16. The data driver of claim 14, wherein the first logic gate group further includes:

a NOT gate configured to invert a logic level of one of the plurality of mux control signals to output an inverted signal.

17. The data driver of claim 12, wherein the power control signal is logically summed with the logic signal to generate a combined signal and the combined signal is provided to the power management circuit.

18. The data driver of claim 17, wherein the power consumption mode is changed by the power control signal to increase power consumption based on the combined signal, and wherein the power management circuit is configured to change a magnitude of the bias current based on a change of the changed power consumption mode.

19. A display device, comprising:

a display panel including a plurality of subpixels, a plurality of data lines and a plurality of gate lines;

a data driver configured to supply data voltages to the plurality of data lines via output buffers; and a multiplexer connected between the data driver and the plurality of data lines, the multiplexer being configured to receive a plurality of mux control signals and supply the data voltages to the plurality of data lines based on the plurality of mux control signals, wherein the data driver includes a calculator configured to output a logic signal, and wherein the data driver is further configured to:

in response to the calculator transitioning the logic signal from a second level corresponding to a first state including only one of the plurality of mux control signals being at a turn on level while remaining mux control signals among the plurality of mux control signals are at a turn-off level, to a first level corresponding to a second state including at least two of the plurality of mux control signals having the turn-on level at a same time, increase a power level supplied to at least one output buffer among the output buffers.

* * * * *